Jan. 21, 1964    T. J. SMALL    3,118,288
APPARATUS FOR USE IN CHARGING AND/OR DRYING
A REFRIGERATION SYSTEM
Filed April 13, 1961    3 Sheets-Sheet 1
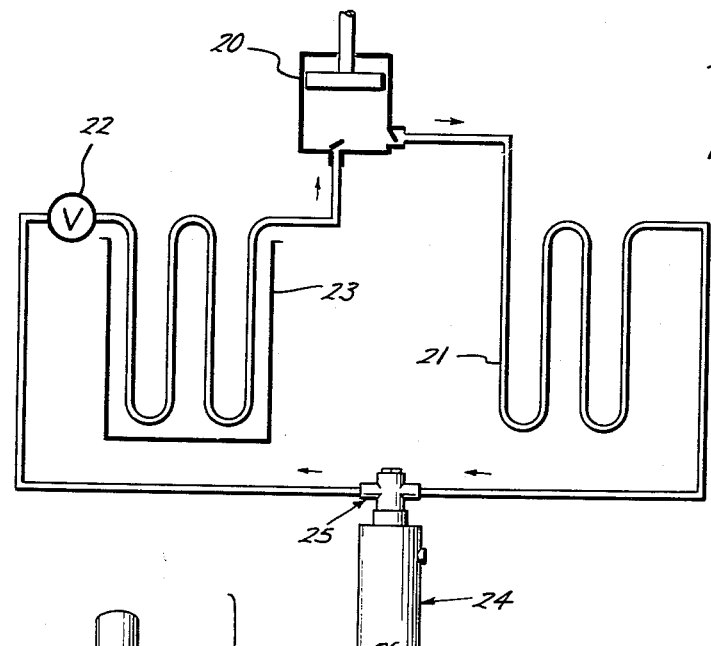
Fig. 1
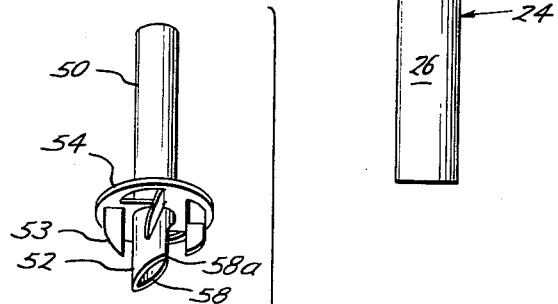
Fig. 5
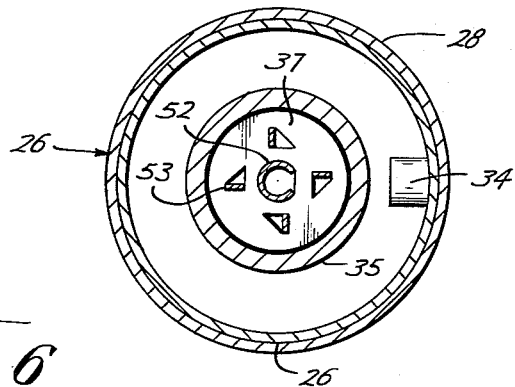
Fig. 6
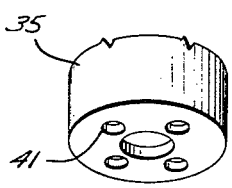
Terrell J. Small
INVENTOR.
BY
Browning, Simms, Hyer
& Eickenroht
ATTORNEYS

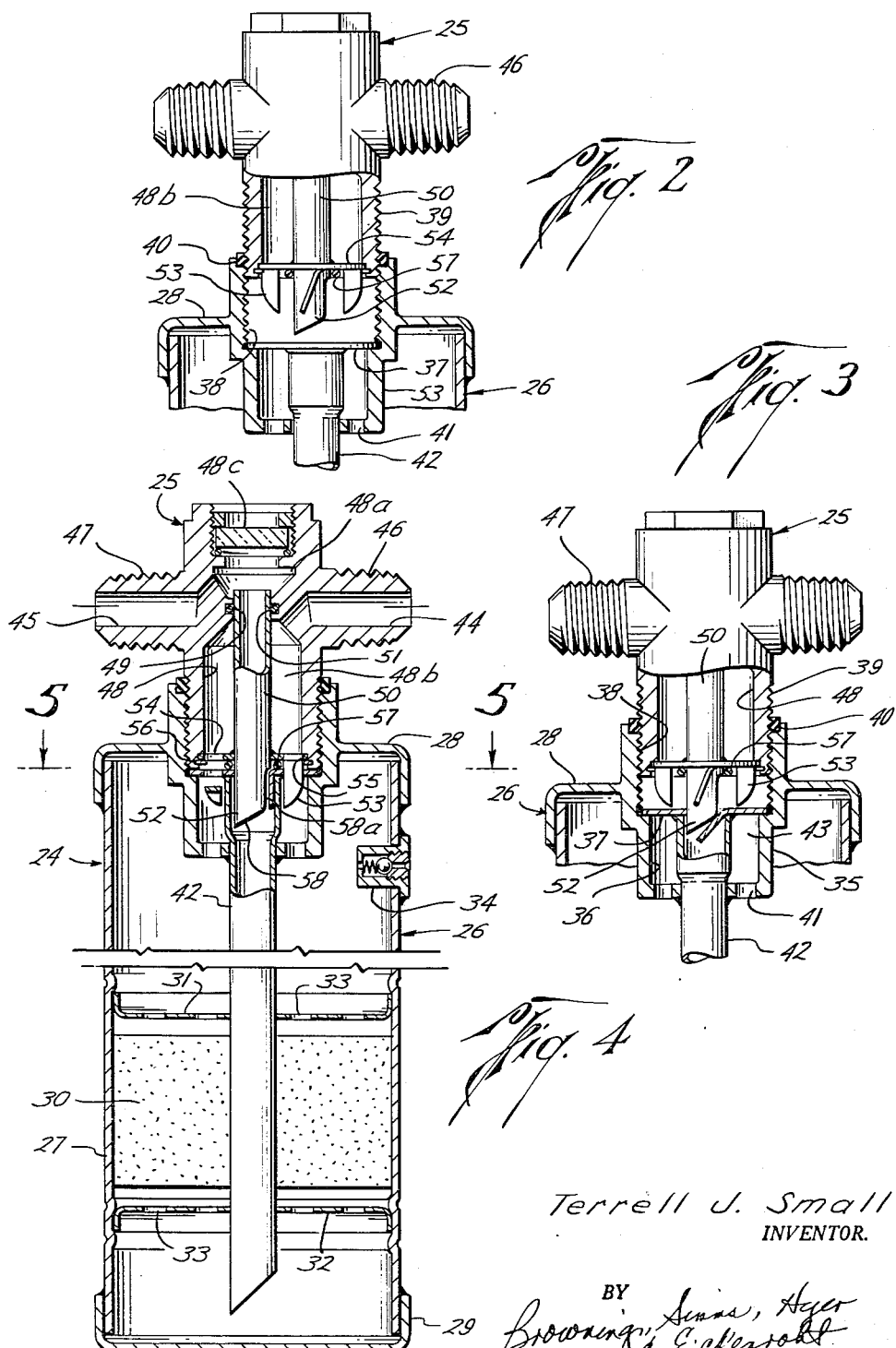

Jan. 21, 1964 T. J. SMALL 3,118,288
APPARATUS FOR USE IN CHARGING AND/OR DRYING
A REFRIGERATION SYSTEM
Filed April 13, 1961 3 Sheets-Sheet 3
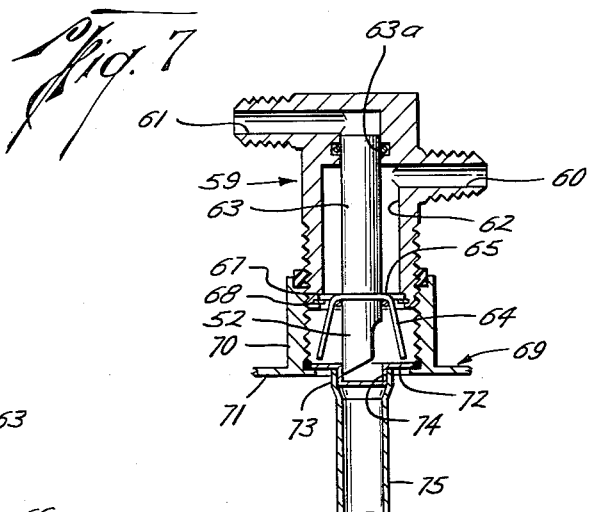
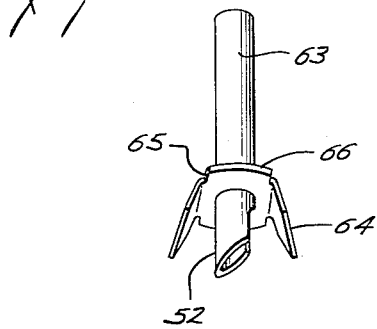
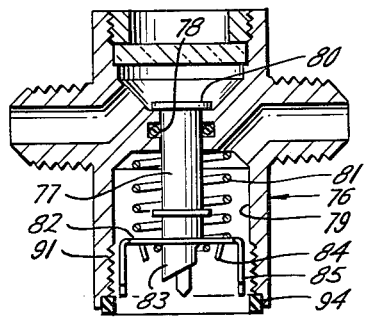
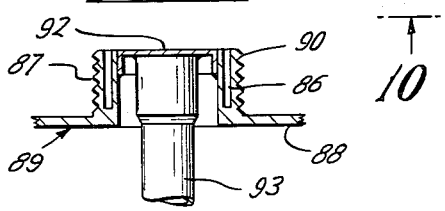
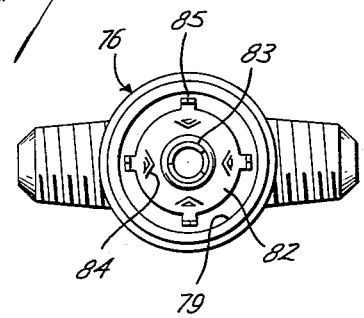
Terrell J. Small
INVENTOR
BY
Browning, Simms, Hyer
& Eickerrott
ATTORNEYS United States Patent Office 3,118,288
Patented Jan. 21, 1964

1

3,118,288
APPARATUS FOR USE IN CHARGING AND/OR
DRYING A REFRIGERATION SYSTEM
Terrell J. Small, P.O. Box 9751, Fort Worth, Tex.
Filed Apr. 13, 1961, Ser. No. 102,676
18 Claims. (Cl. 62—292)

This invention relates to improved apparatus for use in charging and/or drying a refrigeration system, such as in the conventional automobile air conditioner.

When a refrigerant system of this type requires recharging, it is seldom practical to attempt to recover the remaining charge because of the time and trouble involved. Consequently, when it is to be recharged, the system is merely opened up to the atmosphere. On the other hand, the small amount of charge to be added is fairly critical and must therefore be measured. In some cases, the new charge has been taken from a large container from which the operator either meters same or determines when the system is properly charged by observing the rise in the system pressure. This procedure is not only subject to error, but also requires the storage of the large containers. Even when smaller containers are used, the refrigerant to be added must still be metered from one or more of them.

In the introduction of a new refrigerant charge, as well as prior to the replacement of an exhausted dryer, the system must be evacuated. Then the charge and/or dryer is disposed in the system without exposing either the system or the charge and/or dryer to the atmosphere. In the past, this has required further time consuming and complicated adjustment, such as the installation and manipulation of various evacuating and filling valves.

An object of this invention is to provide apparatus of this type which does not require the operator to either measure the charge or carry out the complicated procedure of preparing the system for the charge and/or dryer.

Another object is to provide such apparatus in which an amount of the charge sufficient to charge the system and/or the dryer may be introduced into said system upon the making up of only a single joint.

A further object is to provide apparatus of the type above described which facilitates the evacuation of the system during the single make-up, and, more particularly, which serves to seal off the system for evacuation purposes at a predetermined interval prior to disposal of the charge and/or dryer therein.

Still another object is to provide a compact combination or package of parts for accomplishing these purposes, which are adapted to be made up with one another, as above described, with a minimum of time and effort.

Other objects, advantages and features of the invention will be apparent to one skilled in the art upon consideration of the written specification, the attached claims and the annexed drawings.

These and other objects are accomplished, in accordance with the illustrated embodiments of the present invention, by apparatus which includes two basic parts—a fitting connectable in the refrigeration system and a container filled with a measured amount of refrigerant and/or a dryer. The container is connectable to the fitting in

2 a manner to first seal off the system so that it may be evacuated and then to direct the flow of the system refrigerant through the container, whereby the refrigerant is introduced into the system to charge it and passed through the dryer. More particularly, the fitting and container are so constructed that the system is sealed and the refrigerant and/or dryer are automatically disposed therein merely upon the making up of the connection between them.

The container has an opening therefrom which is sealed by a frangible diaphragm across the opening, and a dip tube extends from the inner side of the diaphragm into the container to assure a solid column of liquid refrigerant to the expansion valve. When the dryer is disposed within the container, the dip tube extends beyond it. The fitting, on the other hand, comprises a body having an inlet to and outlet from a chamber therein which opens to one end of the body. A tube is mounted in the fitting for connection with the outlet separately of the connection of the inlet with the chamber outside of the tube.

The fitting and container are provided with means for connecting them together with the container opening and the diaphragm thereacross opposite the opening from the fitting and the tubes in substantial alignment with one another. More particularly, the tube in the fitting carries cutter means on its outer end which puncture the diaphragm both within the tube thereon as well as outside of the tube, as the connection between the container and fitting is made up. However, the cutter means is so located that it will not puncture the diaphragm until after an initial stage of the make-up during which the connection seals off the system for evacuation purposes. Upon further making up sufficient to puncture the diaphragm, system refrigerant is directed from the inlet of the fitting through the space about the tubes into the lower end of the container tube and then through both tubes into the fitting outlet.

In the drawings, wherein like reference characters are used throughout to designate like parts:

FIG. 1 is a diagrammatic view of a refrigeration system into which the apparatus of the present invention has been connected;

FIG. 2 is an enlarged view, partly in section, of a fitting and the upper end of a container, both constructed in accordance with one embodiment of the present invention, and as the connection between them is first made up to seal off the fitting without puncturing the diaphragm;

FIG. 3 is a view similar to FIG. 2, but wherein the fitting and container have been further made up to at least partially puncture the diaphragm;

FIG. 4 is a sectional view of the apparatus of FIGS. 2 and 3, but showing the container fully made up with the fitting to complete the puncturing of the diaphragm;

FIG. 5 is a cross-sectional view of the container, as seen along broken lines 5—5 of FIG. 4;

FIG. 6 is a perspective exploded view of the tubes within the fitting and container, the diaphragm, and associated parts for mounting the tubes, all removed from the apparatus of FIGS. 2 to 5;

FIG. 7 is a cross-sectional view of another embodiment of the apparatus of the present invention, and showing the upper end of the container of such apparatus as it is first made up with the fitting thereof;

FIG. 8 is a perspective view of the tube removed from the fitting of FIG. 7;

FIG. 9 is a sectional view of still another embodiment of apparatus constructed in accordance with this invention, and showing the upper end of the container thereof prior to its making up with the fitting; and FIG. 10 is a lower view of the end of the fitting of FIG. 9, as seen along broken line 10—10 of such figure.

The refrigeration system shown in FIG. 1 comprises a compressor 20, a condenser 21, an expansion valve 22, and an evaporator 23, all connected in series. As well known in the art, the flow through a conventional system of this type is in the direction of the arrows, or from the compressor through the condenser, expansion valve, and evaporator back into the compressor. The apparatus of the present invention, which is indicated in its entirety by reference character 24, comprises basically a fitting 25 and container 26, the fitting being connected in the system, and the container being connected to the fitting so as to dispose the refrigerant therein within the system and/or to cause the flow of the refrigerant to pass through a dryer contained therein, all in a manner to be described more fully hereinafter. The container serves to separate uncondensed gas from liquid refrigerant to assure the solid column of liquid refrigerant to the expansion valve 22.

As shown in FIG. 4, the container 26 comprises a central cylindrical portion 27 closed at opposite ends by a top 28 and bottom 29. A dryer 30 of suitable material is carried across an intermediate portion of the container by means of upper and lower plates 31 and 32 which are perforated at 33 to permit the flow of refrigerant through the dryer. The container may also be filled with an amount of refrigerant at least sufficient to charge the system above described. Inasmuch as the capacity of similar systems will vary somewhat, the container will have a limited excess of refrigerant. This invention contemplates that the container may be filled with one or both of the refrigerant and dryer. In any case, the container is sealed for this purpose, at least prior to being punctured during the making up of the container with the fitting, as described hereinafter.

As shown in FIG. 4, there is a check valve 34 in the wall of the cylindrical portion 27 of the container through which the latter may be filled with refrigerant. For this purpose, and as shown in FIG. 4, the valve includes a valve member which is normally spring pressed to closed position, but which is adapted to be opened by a suitable tool from the outside of the container.

The cover 28 of the container has a cylindrical boss or collar 35 with an opening 36 therethrough which is normally closed by a frangible diaphragm 37 cemented or otherwise secured thereacross. As shown in FIGS. 2 to 4, the upper end of the boss 35 is provided with female threads 38 for connection with male threads 39 on the fitting 25. A ring 40 of plastic sealing material is cemented to the upper end of the boss above the female threads 38 so as to seal with the threads 39 on the fitting 25 as the container is first made up with the fitting, as shown in FIG. 2. At this stage of the make-up, the container seals off the system, as will be described below.

The lower cup-shaped end of the boss 35 depends into the container and has a series of holes 41 therein about a tube 42 connected at its upper end to the inner side of the diaphragm 37 and extending downwardly through the boss and into the container beneath the dryer 30, as shown in FIG. 4. The intermediate portion of the tube extending through the boss may be cemented thereto, as shown, for additional support. The upper end of the tube is of smaller diameter than the opening 36 through the boss 35 so as to provide a space 43 thereabout connecting an annular portion of the diaphragm 37 with the aforementioned holes 41.

As best shown in FIG. 4, the body of the fitting 25 has an inlet 44 thereto and an outlet 45 therefrom, both of which are disposed within body extensions 46 and 47, respectively, which are threaded for connection into the refrigerant system, as shown in FIG. 1. Both the inlet and outlet connect with a chamber 48 in the fitting body which extends longitudinally within the threaded portion 39 of the body. The end of the chamber 48 is open for disposal opposite the opening from the container and diaphragm 37 thereacross as the threads 38 and 39 are made up with one another.

The chamber 48 is separated into an upper portion 48a and a lower portion 48b by means of a restricted opening 49 within the body. As shown in FIG. 4, the upper chamber portion 48a connects directly with the outlet 45, while the inlet 44 connects directly with the lower portion 48b. A tube 50 extends longitudinally within the fitting to provide an annular space within the chamber portion 48b, and has an upper end which connects with the upper chamber portion 48a and outlet 45 separately of such space. More particularly, the upper end of the tube 50 extends through an O-ring 51 carried within the restricted opening 49 for sealing thereabout during rotation of the tube for a purpose to be described below.

There are cutter means on the lower end of the fitting tube 50 including a tubular extension 52 forming a continuation of the tube 50 aligned with the container tube 42, as the fitting and container are made up, to puncture the diaphragm 37 within the container tube. The cutter means also includes a plurality of cutter parts 53 on a plate 54 which is secured in any suitable manner about the tube 50. These latter parts 53 puncture the annular portion of the diaphragm about the tube 42 to connect the annular space within the chamber 48 with the annular space 43 with container boss 36.

The plate 54 is carried by the body between a downwardly facing shoulder 55 within the chamber 48 and a snap ring 56 or other suitable fastening means held within a recess beneath the plate. This means for mounting the plate permits the plate, the cutter parts thereon, and the tube 50 to rotate with the container 26 upon puncturing the diaphragm and during continued make-up between the container and fitting, as will be described below. This mounting also facilitates the assembly and replacement of the tube 50 and plate 54 through the open end of the chamber 48.

As will be noted from a comparison of FIGS. 3 and 4, during an intermediate stage of the make-up of the container with the fitting, and subsequent to the sealing of the ring 40 about the threads 39 on the fitting, the cutter parts 52 and 53 will engage and then progressively puncture the diaphragm 37 both within and outside of the container tube 42. The initial puncture is provided by the tubular extension 52 inasmuch as it extends lower than the cutter parts 53. Although such an arrangement is desirable in that it first vents the refrigerant charge to the low pressure side of the fitting, it is not essential and when the container is fully made up with the tubing, as by the engagement of the end of the opening from the chamber 48 with the outer side of the edge of diaphragm 37, the diaphragm will also have been punctured within the annular space outside of the tubes 50 and 42 so as to connect the inlet 44 with the lower end of tube 42. Thus, as previously described, the flow of the refrigerant system is from the inlet 44 through the container, and particularly the dryer 30, into the lower end of the tube 42 and then upwardly through tube 42 into the outlet 45.

An O-ring 57 is preferably carried on the outer side of the plate 54 about the tubular extension 52 but within cutter parts 53 so as to seal between the plate and outer side of the diaphragm 37 in the made-up position of the container and fitting. Thus, the parts are sealed against crossover flow between the tubes and the space about them.

The lower end of the tubular extension 52 is cut on a bias at 58 to provide a lower pointed end on one side, and is upwardly relieved at 58a along its opposite side to a point below the plate 54. More particularly, this relief stops short of a position in which it would shear an entire coupon within the tube 42 as it punctures same. To the contrary, the cutter part provided by the tubular extension 52 merely severs the central portion of the diaphragm about a major portion of its circumference and then folds it back and to one side between the relief 58a and the upper end of container tube 42.

The cutter parts 53, on the other hand, are provided by substantially triangularly shaped portions which are struck from the plate at equally spaced apart locations, as best shown in FIG. 5. These parts are also thereby provided with lower pointed ends for progressively puncturing the diaphragm and folding a severed portion back behind the struck portion without shearing a coupon from the diaphragm.

As previously mentioned, the plate 54, and thus cutter parts 52 and 53, are rotatably mounted within the fitting 25. In accordance with a preferred form of the invention, the diaphragm is of a relatively strong material, such as a copper disc, which is not easily machined, as by a rotary cutting action. As a consequence, when it first punctures the diaphragm 37, the cutter part 52 as well as the other parts rotatable therewith, including the tube 50, are caused to rotate with the diaphragm and container as the latter continues to be threaded onto the fitting. As a result, the cutter parts do not machine a coupon from any part of the diaphragm, but merely bear against the cut-out portions of the diaphragm as the latter rotates with the container. This is of particular advantage where, as here, the make-up is a threaded connection, because it prevents the system from being fouled with one or more coupons cut from the diaphragms. As previously noted, the upper end of the tube 50 maintains a seal with O-ring 51 as it rotates with the diaphragm.

As shown in FIG. 2, the inlet 44 and outlet 45 of the fitting 25 are disposed oppositely to one another and perpendicularly with respect to the tube 50. Also, there is a transparent window 48c over an opening from the upper chamber portion 48a and opposite the tube 50 which permits inspection of the system, particularly when it is being evacuated and recharged, as contemplated by this invention. As in other systems, this window or sight glass permits the operator to determine the presence of bubbles in the liquid column of refrigerant, which indicates a shortage of same in the system.

When a refrigeration system provided with the apparatus 24 of the present invention is to be recharged with refrigerant and/or provided with a new dryer, the container 26 is first removed from its connection to the fitting 25 to release the remaining refrigerant in the system. Then, a new container, or for that matter the old container with a new frangible diaphragm and upon recharging, is initially made up with the fitting to a position approximating that shown in FIG. 2. At any such position, which could be gauged by suitable means such as markings upon the male threads 39 on the fitting, the operator knows that the opening from the chamber 48 is closed and sealed off by ring 40. At the same time, however, he knows that the diaphragm 37 has not been punctured so that the refrigerant and/or dryer is sealed within the container.

With the system thus sealed from the atmosphere as well as the interior of the container, it may be evacuated in any well known manner utilizing the compressor 20 or a separate pump, if desired. When the system is found to be leak-tight and properly evacuated, the container is further made up with the fitting, and particularly to a point such as shown in FIG. 4, wherein further make-up is impossible. At this time, the operator knows that the cutter parts on the tube 50 have punctured the diaphragm 37 so as to connect the inlet 44 with the outlet 45 in a flow path for the refrigerant passing through the container 26 and particularly through the lower end of tube 42 within the container.

In the embodiment of the invention shown in FIGS. 7 and 8, the body of the fitting 59 is of simpler construction in that the inlet 60 and outlet 61 are provided by straight drilled holes within threaded extensions on each side of the body. Also, there is no sight glass or window in the upper portion of the chamber 62 within the fitting body. As in the above-described form, however, there is a tube 63 which extends longitudinally within the chamber 62 and has an upper end which is sealably and rotatably received within an O-ring 63a or other means carried within a restricted opening in the body separating the chamber into upper and lower portions.

The cutter means on the lower end of the tube 63 comprises a tubular extension 52 identical to that previously described. In this form, however, the additional cutter parts may merely comprise pointed blades 64 turned down from opposite sides of a plate 65 secured in any suitable manner about the lower end of the tube 63. As best shown in FIG. 8, the plate has outwardly extending portions 66 on its sides intermediate the knives 64 for reception within the grooves 67 of the chamber 62. As in the case of the plate about the fitting tube of the earlier embodiment, the plate 65 is removably held in place for rotation within the chamber by means of a snap ring 68.

The container 69 of this embodiment is also simplified in several respects. For one thing, the boss 70 on its cover 71 projects only from the outside of the cover and has female threads for connection to male threads about the portion of the body of the fitting surrounding chamber 62, as in the earlier embodiment. In this form, the diaphragm 72 across the opening through the boss 70, and cemented thereto in any suitable manner, is provided with a recessed cylindrical portion 73 over which the upper end 74 of dip tube 75 is tightly fittable. This tight fit supports the tube from the diaphragm in a position to receive the tubular extension 52 as the latter penetrates the central portion of the diaphragm. In other respects, the operation and function of this embodiment of the apparatus is similar to the one previously described.

In the embodiment of the invention shown in FIGS. 9 and 10, the body of fitting 76 is sufficiently identical to that of the body of fitting 25 that a detailed description is unnecessary. However, in this form of the fitting, a tube 77 is longitudinally slidable through the restricted opening 78 within the chamber 79 of the fitting body. As shown in FIG. 9, the upper end 80 of this tube is enlarged to seat upon a shoulder at one end of the restricted chamber opening 78, and a spring 81 disposed between the opposite sides of the restricted opening and the upper side of a plate 82 on the lower end of the tube normally urges the tube to a downwardly position limited by the enlarged end 80. The plate 82 on the tube 77 is provided with a tubular extension 83 which may be identical to the tubular extensions previously described, and cutter parts or knives 84 are struck from the plate about the tubular extension 83, again in a manner similar to that previously described.

As distinguished from the other embodiments of this invention, however, the embodiment of FIGS. 9 and 10 has a means in addition to the disposal of the cutter parts within the punctured openings in the diaphragm of the container for causing the cutter parts to rotate with the container. For this purpose, the outer edge of the plate 82 is provided with a plurality of spaced-apart prongs 85 which extend outwardly for fitting within identically spaced-apart slots 86 formed in the outer end of boss 87 on the cover 88 of the container 89 of this embodiment. Thus, as the container is first made up with the fitting 76, as by connection of its male threads 90 with female threads 91 about the lower end of the chamber 79 of the fitting, the prongs 85 will be received within the slots 86 so as to cause the cutter parts to rotate with the container during further making up of the container with the fitting, and particularly before sufficient make-up to cause the cutter parts 83 and 84 to puncture the diaphragm 92 from which the dip tube 93 depends. As will be appreciated, the yieldable urging of the spring 81 permits the prongs 85 to locate within the slots 86 during this initial make-up.

In this particular embodiment of the invention, the seal ring 94 is carried on the lower end of the chamber 79, and particularly beneath the female threads 91 to form a seal with the male threads 87 on the container during the initial make-up prior to puncturing of the diaphragm. Thus, this embodiment of the invention also operates and functions similarly to the one described in FIGS. 1 to 6.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in charging and drying a refrigerant system, comprising a fitting connectable in the system and having an opening therefrom, a container for the charge and dryer having an opening therefrom and a frangible diaphragm sealing across said opening, means for connecting the container to the fitting with the container opening and the diaphragm thereacross opposite the opening from the fitting, and means for puncturing the diaphragm to release the charge into the system and direct the flow of the refrigerant system through the dryer within the container as said connection is made.

2. Apparatus of the character defined in claim 1, including means for sealing about the openings from the fitting and container as they are connected and prior to puncturing of the diaphragm.

3. Apparatus for use in charging and drying a refrigerant system, comprising a fitting having an inlet and outlet for connection in the system, an opening from the fitting, a container for the charge having an opening therefrom and a frangible diaphragm sealing across said opening, a tube on the inner side of the diaphragm and extending therefrom into the container, a dryer about the tube means for connecting the container to the fitting with the container opening and diaphragm thereacross opposite the opening from the fitting, and means in the fitting and operable during connection of the container thereto for puncturing the diaphragm within the tube as well as exteriorly thereof to release the charge into the refrigerant system and direct the flow of the refrigerant system from the inlet to the outlet through the dryer in the container and tube therein.

4. Apparatus for use in charging and drying a refrigerant system, comprising a fitting having an inlet thereto and outlet therefrom connectable in the system, a chamber in the fitting having an opening therefrom, a container for the charge having an opening therefrom and a frangible diaphragm sealing across said opening, a tube on the inner side of the diaphragm and extending therefrom into the container, a dryer about the tube, means for threadedly connecting the container to the fitting with the container opening and diaphragm thereacross opposite the opening from the chamber in the fitting, and means mounted in the fitting chamber for puncturing the diaphragm within the portion thereof from which the tube extends as well as exteriorly of said portion, during the initial connection of the container to the fitting, and rotating with the container during continued connection of the container to the fitting and until the connection is fully made up to release the charge into the system and direct the flow of the refrigerant system from the inlet through the dryer within the container and tube into the outlet.

5. Apparatus of the character defined in claim 4, wherein said last-mentioned means comprises a tube rotatably mounted in the fitting for extension within the fitting chamber and having a tubular extension thereon disposable within the container tube upon puncturing of the diaphragm portion thereacross.

6. Apparatus of the character defined in claim 5, including means sealing between the puncturing means in the fitting and the diaphragm intermediate the punctured portions of the diaphragm within the container tube and exteriorly thereof.

7. A fitting for use in the charging and drying of a refrigerant system, comprising a body having a chamber therein with an open end for connection to a sealed container for said charge and dryer, an inlet to and an outlet from the chamber for connection in the system, a tube mounted in the body for free rotation therein and extending longitudinally within the chamber in spaced relation thereto, the inner end of said tube connecting with the outlet separately of the connection of the inlet with the space between the tube and chamber, and outwardly facing cutter means on the tube to form openings in the sealed container, upon connection thereto, which communicate with said tube and space, respectively.

8. A fitting of the character defined in claim 7, wherein said cutter means includes a tubular extension of said tube and a plate carried about the tube and having cutter parts thereon.

9. A fitting of the character defined in claim 8, including annular seal means carried on the outer side of the plate between the tubular extension and last-mentioned cutter parts.

10. A fitting of the character defined in claim 8, wherein said tubular extension is cut on a bias to provide a pointed end on one side thereof and is relieved inwardly along the opposite side.

11. A fitting of the character defined in claim 8, wherein said cutter parts comprise substantially triangularly shaped portions struck outwardly from the plate.

12. A fitting for use in the charging and drying of a refrigerant system, comprising a body having a chamber therein with a first portion separated from a second portion by a restricted passage, the second chamber portion having an opening to which a sealed container for said charge and dryer may be connected, an inlet to the second chamber portion and an outlet from the first chamber portion each for connection in the system, a tube mounted within the body for extension longitudinally within the second chamber portion to define an annular space therein and having one end freely rotatably and sealably received within the restricted passage, and means carried on the other end of the tube for cutting openings in the sealed container, as it is connected to said body opening, which communicate with said tube and annular space, respectively.

13. A fitting of the character defined in claim 12, wherein said cutting means comprises a plate having cutter parts disposed about the tube and held by the body for rotation without longitudinal movement.

14. A fitting of the character defined in claim 12, including prongs carried by the tube and extending outwardly from said lower end thereof for alignment with parts on the container as said connection is made and prior to the cutting of said openings.

15. A fitting of the character defined in claim 12, wherein the inlet and outlet extend in opposite directions perpendicularly to the tube, and there is a window in the first chamber portion opposite the one end of the tube.

16. Apparatus for use in charging and drying a refrigeration system, including a container having an opening therein, means on the container and about the opening for connection to a fitting, a frangible diaphragm sealing across the opening, a tube having its inner end attached to a portion of the inner side of the diaphragm and extending into the container, and a dryer disposed across the annular space between the tube and the container.

17. Apparatus of the character defined in claim 16, wherein there is a refrigerant in the container.

18. Apparatus of the character defined in claim 16, including a valve in a wall of the container.

References Cited in the file of this patent

UNITED STATES PATENTS

| | | |
|---|---|---|
| 1,924,007 | Weatherhead | Aug. 22, 1933 |
| 2,073,670 | Allen | Mar. 16, 1937 |
| 2,090,977 | Hoffman | Aug. 24, 1937 |
| 2,758,719 | Line | Aug. 14, 1956 |
| 2,835,114 | Shoemaker et al. | May 20, 1958 |
| 2,893,603 | Franck | July 7, 1959 |
| 3,080,977 | Jones | Mar. 12, 1963 |